US012607753B2

(12) United States Patent
Jalalirad et al.

(10) Patent No.: US 12,607,753 B2
(45) Date of Patent: Apr. 21, 2026

(54) OPTIMIZING WEIGHTED LEAST SQUARE (WLS) INPUTS TO IMPROVE GLOBAL NAVIGATION SATELLITE SYSTEMS (GNSS) LOCALIZATION

(71) Applicant: QUALCOMM Incorporated, San Diego, CA (US)

(72) Inventors: Amir Jalalirad, Eindhoven (NL); Bence Major, Amsterdam (NL); Davide Belli, Diemen (NL); Songwon Jee, San Jose, CA (US); Himanshu Shah, Milpitas, CA (US); William Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 18/177,713

(22) Filed: Mar. 2, 2023

(65) Prior Publication Data

US 2024/0295661 A1 Sep. 5, 2024

(51) Int. Cl.
G01S 19/07 (2010.01)
G01S 19/06 (2010.01)
G01S 19/20 (2010.01)

(52) U.S. Cl.
CPC .............. *G01S 19/07* (2013.01); *G01S 19/06* (2013.01); *G01S 19/20* (2013.01)

(58) Field of Classification Search
CPC ........... G01S 19/07; G01S 19/06; G01S 19/20
(Continued)

(56) References Cited

U.S. PATENT DOCUMENTS 6,356,232 B1 3/2002 Rocken et al.
2002/0198657 A1 12/2002 Robbins
(Continued)

FOREIGN PATENT DOCUMENTS

AU 2014398394 A1 12/2016
CN 106093967 A 11/2016
(Continued)

OTHER PUBLICATIONS

Akram M.A., et al., "GNSS Positioning Accuracy Enhancement Based on Robust Statistical MM Estimation Theory for Ground Vehicles in Challenging Environments", Applied Sciences, vol. 8, No. 6, May 25, 2018, p. 876, pp. 1-23, XP093171558, figure 1, Sections 4 to 6, Appendix C.
(Continued)

*Primary Examiner* — Harry K Liu
(74) *Attorney, Agent, or Firm* — Weaver Austin Villenueve & Sampson LLP

(57) ABSTRACT

A method of determining a position of a device includes obtaining an initial position of the device without using Global Navigation Satellite System (GNSS) satellites. GNSS measurements are taken of radio frequency (RF) signals transmitted by the GNSS satellites. Initial residuals are determined based, at least in part, on GNSS measured distances determined from the at least a portion of the GNSS measurements and expected distances determined from the initial position. Errors of the GNSS measurements based on the RF signals are estimated. An optimization is performed using some of the estimated errors to produce a modified set of residuals, wherein the optimization is further based on H, wherein H represents a matrix with trigonometric functions of a geometry of the GNSS satellites. A cost minimization method of the modified set of residuals and actual geometry
(Continued)

of the GNSS satellites (H) to determine an improved position of the device.

30 Claims, 10 Drawing Sheets

(58) Field of Classification Search
USPC ......................................................... 342/352
See application file for complete search history.

(56) References Cited

U.S. PATENT DOCUMENTS

| | | | |
|---|---|---|---|
| 2010/0141510 A1 | 6/2010 | Dai et al. | |
| 2012/0249368 A1 | 10/2012 | Youssef et al. | |
| 2015/0253431 A1 | 9/2015 | Averin et al. | |
| 2016/0325582 A1 | 11/2016 | Werner et al. | |
| 2020/0348422 A1 | 11/2020 | Carcanague et al. | |
| 2022/0011446 A1 | 1/2022 | Segal et al. | |
| 2022/0018969 A1 | 1/2022 | Fine et al. | |
| 2022/0107427 A1 | 4/2022 | Kleeman et al. | |
| 2022/0169401 A1* | 6/2022 | Di Cosola | B64U 70/95 |
| 2022/0171073 A1* | 6/2022 | Savoy, Jr. | G01S 19/215 |
| 2022/0317310 A1 | 10/2022 | He et al. | |
| 2023/0184956 A1 | 6/2023 | Cole et al. | |
| 2023/0384412 A1 | 11/2023 | Morrison et al. | |
| 2023/0393282 A1 | 12/2023 | Kuismanen et al. | |
| 2024/0345256 A1 | 10/2024 | Rautalin et al. | |
| 2024/0402349 A1 | 12/2024 | Wang | |
| 2024/0402350 A1 | 12/2024 | Peng et al. | |
| 2025/0004142 A1 | 1/2025 | Belli et al. | |

FOREIGN PATENT DOCUMENTS

| | | | |
|---|---|---|---|
| CN | 112327341 A | 2/2021 |
| CN | 113031031 A | 6/2021 |
| CN | 116840874 A | 10/2023 |
| EP | 3206050 A1 | 8/2017 |
| EP | 3904911 A1 | 11/2021 |
| WO | 2009125011 A1 | 10/2009 |
| WO | 2021237804 A1 | 12/2021 |
| WO | 2021211805 A9 | 11/2022 |

OTHER PUBLICATIONS

International Search Report and Written Opinion—PCT/US2024/017051—ISA/EPO—Jun. 25, 2024.

Kanhere A.V., et al., "Improving GNSS Positioning Using Neural-Network-Based Corrections", Dec. 1, 2022, vol. 69, No. 4, Dec. 1, 2022, 20 Pages, XP056017377, Abstract.

Suzuki T., et al., "NLOS Multipath Detection Using Convolutional Neural Network", GNSS 2020—Proceedings of the 33rd International Technical Meeting of the Satellite Division of the Institute of Navigation (ION GNSS+ 2020), The Institute of Navigation, 8551 Rixlew Lane Suite 360 Manassas, VA 20109, USA, Sep. 25, 2020, pp. 2989-3000, XP056016217, Introduction.

Peng Y.X., et al., "Characterization of Multi-Scale Ionospheric Irregularities Using Ground-Based and Space-Based GNSS Observations", Satellite Navigation, vol. 2, No. 14, 2021, pp. 1-21.

Parkinson B.W., et al., "Global Positioning System: Theory and Applications vol. I", Progress in Astronautics and Aeronautics, vol. 163, 1996, American Institute of Aeronautics and Astronautics, Inc., 5 pages. pp. 49-51.

* cited by examiner

100

GNSS
Satellites
110

145-3

140

105

133

145-2

145-1

145

135

Mobile
Device

120

130

Network

170

160

Location
Server (LS)

180

External Client

Positioning
System
100

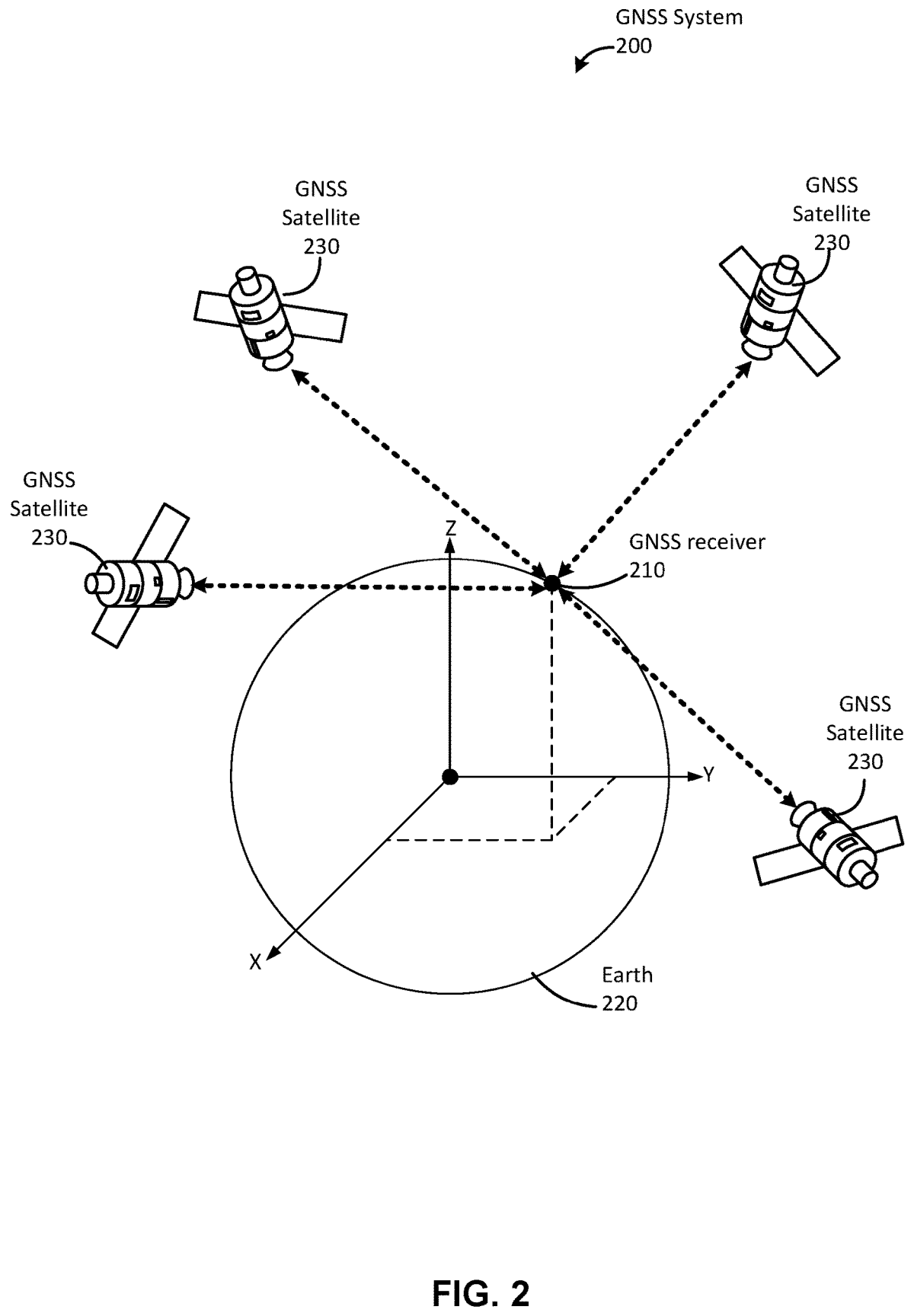

GNSS System
200

GNSS
Satellite
230

GNSS
Satellite
230

GNSS
Satellite
230

GNSS receiver
210

Z

Y

X

GNSS
Satellite
230

Earth
220

FIG. 2

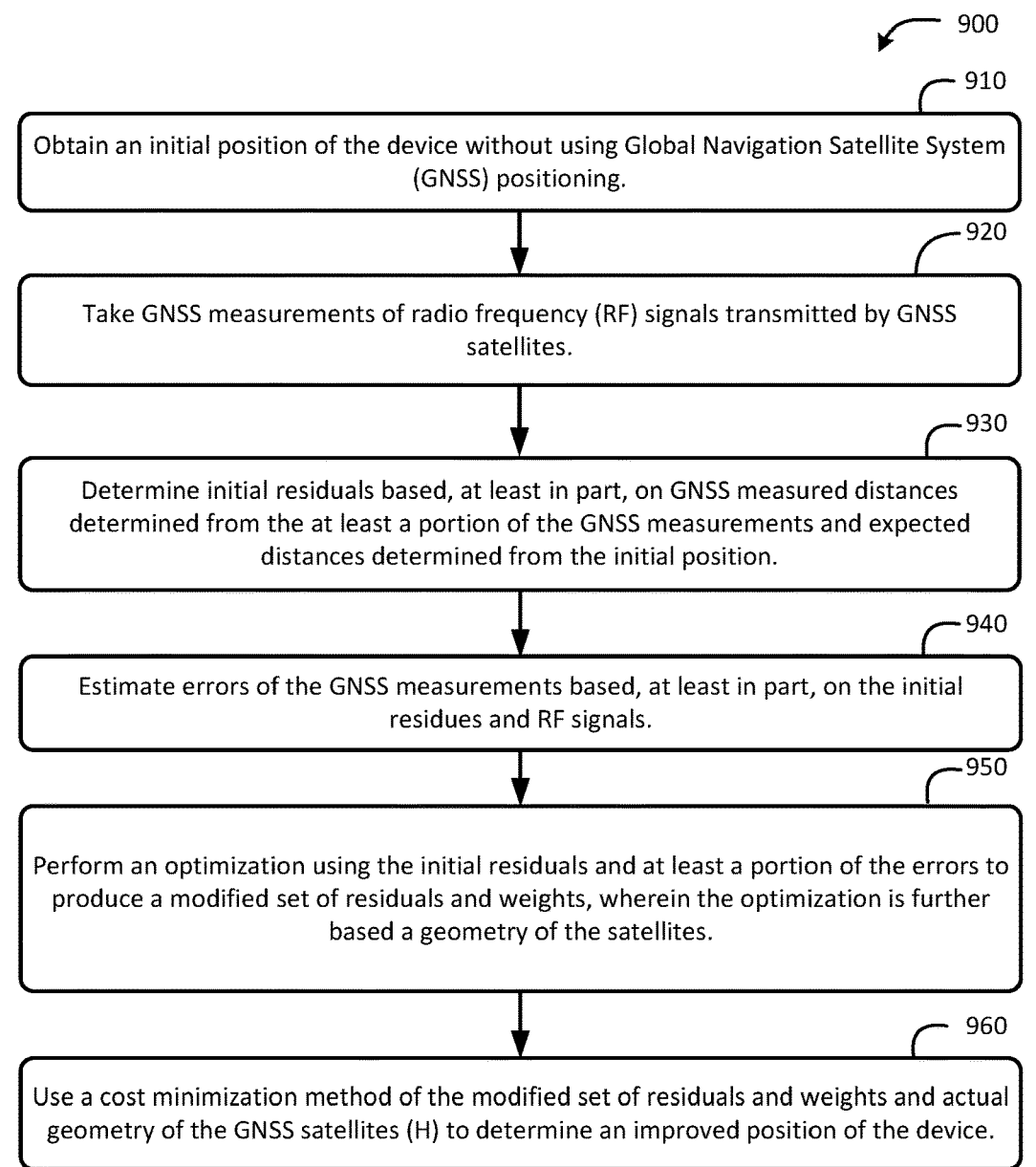

900

910

Obtain an initial position of the device without using Global Navigation Satellite System (GNSS) positioning.

920

Take GNSS measurements of radio frequency (RF) signals transmitted by GNSS satellites.

930

Determine initial residuals based, at least in part, on GNSS measured distances determined from the at least a portion of the GNSS measurements and expected distances determined from the initial position.

940

Estimate errors of the GNSS measurements based, at least in part, on the initial residues and RF signals.

950

Perform an optimization using the initial residuals and at least a portion of the errors to produce a modified set of residuals and weights, wherein the optimization is further based a geometry of the satellites.

960

Use a cost minimization method of the modified set of residuals and weights and actual geometry of the GNSS satellites (H) to determine an improved position of the device.

FIG. 9

OPTIMIZING WEIGHTED LEAST SQUARE (WLS) INPUTS TO IMPROVE GLOBAL NAVIGATION SATELLITE SYSTEMS (GNSS) LOCALIZATION

BACKGROUND

Modern electronic devices frequently include systems that can receive signals from satellite navigation systems, commonly referred to as Global Navigation Satellite Systems (each a GNSS), and use those signals to determine the location of the device, as well as other information such as speed, heading, altitude, etc. Such GNSS receivers may be integrated into consumer electronic devices, such as smartphones or smartwatches, as well as into navigation systems in different types of vehicles, including cars, trucks, ships, and aircraft. Signals are received by GNSS receivers from multiple satellites orbiting the Earth and machine learning models are used to predict the location of a mobile device.

BRIEF SUMMARY

An example method of determining a position of a device comprising: obtaining an initial position of the device without using Global Navigation Satellite System (GNSS) positioning. The method also may comprise taking GNSS measurements of radio frequency (RF) signals transmitted by GNSS satellites. The method also may comprise determining initial residuals based, at least in part, on GNSS measured distances determined from the at least a portion of the GNSS measurements and expected distances determined from the initial position. The method also may comprise estimating errors of the GNSS measurements, based at least in part, on the initial residuals and RF signals. The method also may comprise performing an optimization using the initial residuals and at least a portion of the errors to produce a modified set of residuals, wherein the optimization is further based on a geometry of the GNSS satellites. The method also may comprise using a cost minimization method of the modified set of residuals and the geometry of the GNSS satellites to determine an improved position of the device.

An example device comprising: a memory, one or more processors communicatively coupled with the memory, wherein the one or more processors are configured to obtain an initial position of the device without using Global Navigation Satellite System (GNSS) positioning. The one or more processors further may be configured to take GNSS measurements of radio frequency (RF) signals transmitted by GNSS satellites. The one or more processors further may be configured to determine initial residuals based, at least in part, on GNSS measured distances determined from the at least a portion of the GNSS measurements and expected distances determined from the initial position. The one or more processors further may be configured to estimate errors of the GNSS measurements, based at least in part, on the initial residuals and RF signals. The one or more processors further may be configured to perform an optimization using the initial residuals and at least a portion of the errors to produce a modified set of residuals, wherein the optimization is further based on a geometry of the GNSS satellites. The one or more processors further may be configured to use a cost minimization method of the modified set of residuals and the geometry of the GNSS satellites to determine an improved position of the device.

An example apparatus for determining a position of a device comprising: according to this disclosure, may comprise means for obtaining an initial position of the device without using Global Navigation Satellite System (GNSS) positioning. The apparatus further may comprise means for taking GNSS measurements of radio frequency (RF) signals transmitted by GNSS satellites. The apparatus further may comprise means for determining initial residuals based, at least in part, on GNSS measured distances determined from the at least a portion of the GNSS measurements and expected distances determined from the initial position. The apparatus further may comprise means for estimating errors of the GNSS measurements, based at least in part, on the initial residuals and RF signals. The apparatus further may comprise means for performing an optimization using the initial residuals and at least a portion of the errors to produce a modified set of residuals, wherein the optimization is further based on a geometry of the GNSS satellites. The apparatus further may comprise means for using a cost minimization method of the modified set of residuals and the geometry of the GNSS satellites to determine an improved position of the device.

According to this disclosure, an example non-transitory computer-readable medium stores instructions for determining a position of a device comprising: the instructions comprising code for obtaining an initial position of the device without using Global Navigation Satellite System (GNSS) positioning. The instructions further may comprise code for taking GNSS measurements of radio frequency (RF) signals transmitted by GNSS satellites. The instructions further may comprise code for determining initial residuals based, at least in part, on GNSS measured distances determined from the at least a portion of the GNSS measurements and expected distances determined from the initial position. The instructions further may comprise code for estimating errors of the GNSS measurements, based at least in part, on the initial residuals and RF signals. The instructions further may comprise code for performing an optimization using the initial residuals and at least a portion of the errors to produce a modified set of residuals, wherein the optimization is further based a geometry of the GNSS satellites. The instructions further may comprise code for using a cost minimization method of the modified set of residuals and the geometry of the GNSS satellites to determine an improved position of the device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 2 is a simplified diagram of a GNSS system, according to an embodiment.

FIG. 9 is a flow diagram of a method of determining an improved position of a mobile device based on GNSS data.

Figure 1:
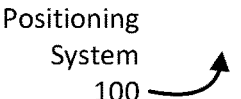
FIG. 1 is a graph illustrating an example positioning system in which, according to some embodiments, the techniques described herein for operating a global navigation satellite system (GNSS) receiver.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative examples will now be described with respect to the accompanying drawings, which form a part hereof. While particular examples, in which one or more aspects of the disclosure may be implemented, are described below, other examples may be used, and various modifications may be made without departing from the scope of the disclosure or the spirit of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

According to an example, a device and/or system may estimate its location based, at least in part, on signals received from space vehicles (SVs) (e.g., satellites). In particular, such a device and/or system may obtain pseudorange measurements comprising approximations of distances between associated SVs and a navigation satellite receiver.

In a particular example, such a pseudorange may be determined at a receiver that is capable of processing signals from one or more SVs as part of a GNSS (which may also be referred to as a Satellite Positioning System (SPS)). Examples of GNSS systems include Global Positioning System (GPS), established by the United States; Globalnaya Navigatsionnay Sputnikovaya Sistema, or Global Orbiting Navigation Satellite System (GLONASS), established by the Russian Federation and similar in concept to GPS; the BeiDou Navigation Satellite System (BDS) created by the Chinese; and Galileo, also similar to GPS but created by the European Community and slated for full operational capacity in the near future. To determine its position, a satellite navigation receiver may obtain pseudorange measurements to four or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in a GPS and/or Galileo types of GNSS systems as specific illustrations according to particular examples, it should be understood that these techniques may also apply to other types of GNSS systems, and that claimed subject matter is not limited in this respect.

A GNSS as referred to herein relates to a navigation system comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. An SV which is a member of a particular GNSS constellation typically transmits navigation signals in a format that is unique to the particular GNSS format. Accordingly, techniques for acquiring a navigation signal transmitted by an SV in a first GNSS may be altered for acquiring a navigation signal transmitted by an SV in a second GNSS. In a particular example, although claimed subject matter is not limited in this respect, it should be understood that GPS, Galileo, and GLONASS each represent a GNSS system that is distinct from the other two named GNSS systems. However, these are merely examples of GNSS systems, and claimed subject matter is not limited in this respect.

According to an embodiment, a navigation receiver may obtain a pseudorange measurement to a particular SV based, at least in part, on an acquisition of a signal from the particular SV which is encoded with a periodically repeating pseudo-noise (PN) (or pseudo-random-noise (PRN)) code sequence. Acquisition of such a signal may comprise detecting a "code phase" which is referenced to time and associated with a point in the PN code sequence. In one particular embodiment, for example, such a code phase may be referenced to a state of a locally generated clock signal and a particular chip in the PN code sequence. However, this is merely an example of how a code phase may be represented and claimed subject matter is not limited in this respect.

According to an embodiment, detection of a code phase may provide several ambiguous candidate pseudoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as the pseudorange measurement to the SV. As pointed out above, a navigation receiver may estimate its location based, at least in part, on pseudorange measurements obtained from multiple SVs.

Various aspects relate generally to GNSS positioning. Some aspects more specifically relate to an improved GNSS position determined using optimized residuals and, in alternative embodiments, optimized weights. As understood by those with ordinary skill in the art, optimal residuals and optimal weights can be derived for weighted least squares (WLS) based triangulation, given measurement errors. In some examples, a machine learning (ML) model may be trained using ground truth measurement errors. This trained model is used to estimate errors at inference time. In some examples, measured GNSS distances and expected distances are used to calculate non-optimized residuals. Next, a WLS Input Optimizer (WIO) block is introduced to operate on the output of the ML model, the estimate errors at inference time, as well as the non-optimized residuals. In the WIO block estimated optimized residuals and optimized weights are derived with a mathematical equation, as described further below.

In some embodiments, an improved method for calculating the position of a mobile device (i.e., device) is applied using radio frequency (RF) signal from four or more GNSS satellites. Initially, the method may comprise obtaining an initial position of the device without using Global Navigation Satellite System (GNSS) satellites. GNSS measurements of radio frequency (RF) signals transmitted by the GNSS satellites are taken and errors of the GNSS measurements are determined based on the RF signals. The method determines initial residuals based, at least in part, on GNSS measured distances determined from the at least a portion of the GNSS measurements and expected distances determined from the initial position. An optimization is performed using the initial residuals and at least a portion of the errors to produce a modified set of residuals and weights (e.g., modified residuals and/or modified weights). The optimization is further based on H, where H represents a matrix with trigonometric functions of a geometry (e.g., azimuth and elevation) of the GNSS satellites. The method uses weighted least squares (WLS) of the modified set of residuals and weights and geometry of the GNSS satellites (H) to determine an improved position of the device.

Particular aspects of the subject matter described in this disclosure can be implemented to realize one or more of the following potential advantages. In some examples, by performing an optimization of residuals (and/or weights), the described techniques can be used to generate a position estimate with higher accuracy than traditional positioning techniques. Moreover, in some embodiments, this may be performed with existing device hardware, with little or no additional cost. These and other advantages will be apparent to a person of ordinary skill in the art in view of the embodiments herein. Details regarding such embodiments are provided after a review of the relevant technologies.

FIG. 1 is a simplified illustration of a positioning system 100 in which a mobile device 105, location server (LS) 160, and/or other components of the positioning system 100 in which the techniques herein for operating a GNSS receiver while calculating an improved position may be performed, according to an embodiment. The techniques described herein may be implemented by one or more components of the positioning system 100. The positioning system 100 can include a mobile device 105, one or more GNSS satellites 110 (or SVs) for a GNSS such as GPS, base stations 120, access points (APs) 130, location server (LS) 160, network 170, and an external client 180. Generally put, the positioning system 100 can estimate a location of the mobile device

105 based on radio frequency (RF) signals received by and/or sent from the mobile device 105 and known locations of other components (e.g., GNSS satellites 110, base stations 120, APs 130) transmitting and/or receiving the RF signals. That said, some embodiments may involve a mobile device that is not part of a larger positioning system (e.g., a system as shown in FIG. 1).

In this example, FIG. 1 illustrates the mobile device 105 as a smartphone device, however, a mobile device may be any suitable device that includes GNSS capabilities or may be a device or machine into which such GNSS capabilities are integrated. Thus, a mobile device 105 may include personal devices such as a smartphone, smartwatch, tablet, laptop, etc. However, devices may include a larger class of devices as well and may include vehicles with integrated GNSS receivers and positioning systems, such as boats or ships, cars, trucks, aircraft, shipping containers, etc. A mobile device communicatively coupled with a cellular network may be referred to as a user equipment (UE).

It should be noted that FIG. 1 provides only a generalized illustration of various components, any, or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a WLAN, a WWAN, and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the 3rd Generation Partnership Project (3GPP). Network 170 may also include more than one network and/or more than one type of network.

The base stations (BS) 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, mobile device 105 can send and receive information with network-connected devices, such as LS 160, by accessing the network 170 via a base station 120 using a first communication link 133. Additionally or alternatively, because APs 130 also may be communicatively coupled with the network 170, mobile device 105 may communicate with Internet-connected devices, including LS 160, using a second communication link 135.

The LS 160 may comprise a server and/or other computing device configured to determine an estimated location of mobile device 105 and/or provide data (e.g., "assistance data") to mobile device 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of mobile device 105 using a control plane (CP) location solution for LTE radio access by mobile device 105. The LS 160 may further comprise a Location Management Function (LMF) that supports location of mobile device 105 using a control plane (CP) location solution for 5G or NR radio access by mobile device 105. In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between LS 160 and mobile device 105 as data (e.g., data transported using the Internet Protocol (IP) and/or Transmission Control Protocol (TCP)) from the perspective of network 170.

As previously noted, the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used and a terrestrial network may be used. For example, in some embodiments, a location of the mobile device 105 may be estimated at least in part based on measurements of RF signals 140 communicated between the mobile device 105 and one or more other devices 145, which may be mobile or fixed. As illustrated, other devices 145 may include, for example, a mobile phone 145-1, vehicle 145-2, and/or static communication/positioning device 145-3. When or more other devices 145 are used in the position determination of a particular mobile device 105, the mobile device 105 for which the position is to be determined may be referred to as the "target device," and each of the one or more other devices 145 used may be referred to as an "anchor device." For position determination of a target device, the respective positions of the one or more anchor devices may be known and/or jointly determined with the target device. Direct communication between the one or more other devices 145 and mobile device 105 may comprise sidelink and/or similar Device-to-Device (D2D) communication technologies. Sidelink, which is defined by 3GPP, is a form of D2D communication under the cellular-based LTE and NR standards.

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g., to assist direction finding or navigation for a user of mobile device or to assist another user (e.g., associated with external client 180) to locate mobile device 105. A "location" is also referred to herein as a "location estimate", "estimated location", "location", "position", "position estimate", "position fix", "estimated position", "location fix" or "fix". A location of mobile device 105 may comprise an absolute location of mobile device 105 (e.g., a latitude and longitude and possibly altitude) or a relative location of mobile device 105 (e.g., a location expressed as distances north or south, east or west and possibly above or below some other known fixed location or some other location such as a location for mobile device 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g., may be accessed by a user of mobile device 105) or may be a server, application, or computer system providing a location service to some other user or users which may include obtaining and providing the location of mobile device 105 (e.g., to enable a service such as friend or relative finder, asset tracking or child or pet location). Additionally, or alternatively, the external client 180 may obtain and provide the location of mobile device 105 to an emergency services provider, government agency, etc.

As illustrated in FIG. 1, the position of mobile device 105 may be determined in a variety of ways. Moreover, a positioning engine (e.g., Kalman filter) executed by the mobile device 105 may use position estimates from one or more of a variety of sources (GNSS, RAT-based positioning, etc.) to determine a final estimated location for the mobile device 105. FIG. 2 and the corresponding description below provide some additional detail regarding how the position of a GNSS receiver of the mobile device 105 may be determined.

FIG. 2 is a simplified diagram of a GNSS system 200, provided to illustrate how GNSS is generally used to determine an accurate location of a GNSS receiver 210 on earth 220. As previously noted, a GNSS receiver 210 may be incorporated into a mobile device 105 or similar mobile device, and GNSS positioning may be one of a plurality of positioning techniques that may be employed to determine the location of the UE/mobile device. Put generally, the GNSS system 200 enables an accurate GNSS position fix of the GNSS receiver 210, which receives radio RF signals from GNSS satellites 230 from one or more GNSS constellations. (GNSS satellites 230 of FIG. 2 may correspond with GNSS satellites 110 of FIG. 1.)

It will be understood that the diagram provided in FIG. 2 is greatly simplified. In practice, there may be dozens of satellites 230 and a given GNSS constellation, and there are many different types of GNSS systems. GNSS systems include, for example, GPS, Galileo, GLONASS, and BDS, as noted. Additionally, GNSS systems may include Quasi-Zenith Satellite System (QZSS) over Japan, Indian Regional Navigational Satellite System (IRNSS) over India, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration, which is a method of determining position by measuring distances to points at known coordinates. In general, the determination of the position of a GNSS receiver 210 in three dimensions may rely on a determination of the distance between the GNSS receiver 210 and four or more satellites 230. As illustrated, 3D coordinates may be based on a coordinate system (e.g., XYZ coordinates; latitude, longitude, and altitude; etc.) centered at the earth's center of mass. A distance between each satellite 230 and the GNSS receiver 210 may be determined using precise measurements made by the GNSS receiver 210 of a difference in time from when a radio frequency RF signal is transmitted from the respective satellite 230 and when it is received at the GNSS receiver 210. To help ensure accuracy, not only does the GNSS receiver 210 need to make an accurate determination of when the respective signal from each satellite 230 is received, but many additional factors need to be considered and accounted for. These factors include, for example, clock differences at the GNSS receiver 210 and satellite 230 (e.g., clock bias), a precise location of each satellite 230 at the time of transmission (e.g., as determined by the broadcast ephemeris), the impact of atmospheric distortion (e.g., ionospheric and tropospheric delays), and the like.

As understood by those of ordinary skill in the art, triangulation/triangulation may be used and may estimate a three-dimensional (3D) position. Triangulation may also estimate the clock difference between the device and the (all of the present) satellite system(s). A clock error may be different for each satellite system (GLONASS, GPS, Galileo, etc.). In summary, triangulation estimates three numbers representing 3D coordinates, and then one number for each satellite system, which represents the time difference between local time and the satellite system's time.

To perform a traditional GNSS position fix, the GNSS receiver 210 can use code-based positioning to determine its distance to each satellite 230 based on a determined delay in a generated pseudorandom binary sequence received in the RF signals received from each satellite, in consideration of the additional factors and error sources previously noted. With the distance and location information of the satellites 230, the GNSS receiver 210 can then determine a position fix for its location. This position fix may be determined, for example, by a Standalone Positioning Engine (SPE) executed by one or more processors of the GNSS receiver 210. However, code-based positioning is relatively inaccurate and, without error correction, is subject to many of the previously described errors. Even so, code-based GNSS positioning can provide a positioning accuracy for the GNSS receiver 210 on the order of meters.

More accurate carrier-based ranging is based on a carrier wave of the RF signals from satellites and may use measurements at a base or reference station (not shown) to perform error correction to help reduce errors from the previously noted error sources. More specifically, errors (e.g., atmospheric errors sources) in the carrier-based ranging of satellites 230 observed by the GNSS receiver 210 can be mitigated or canceled based on similar carrier-based ranging of the satellites 230 using a highly accurate GNSS receiver at the base station at a known location. These measurements and the base station's location can be provided to the GNSS receiver 210 for error correction. This position fix may be determined, for example, by a Precise Positioning Engine (PPE) executed by one or more processors of the GNSS receiver 210. More specifically, in addition to the information provided to an SPE, the PPE may use base station GNSS measurement information, and additional correction information, such as precise orbit and clock, troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters). Embodiments described herein for optimizing WLS inputs may be applied to traditional code-based positioning and/or carrier-based ranging.

Figure 3:
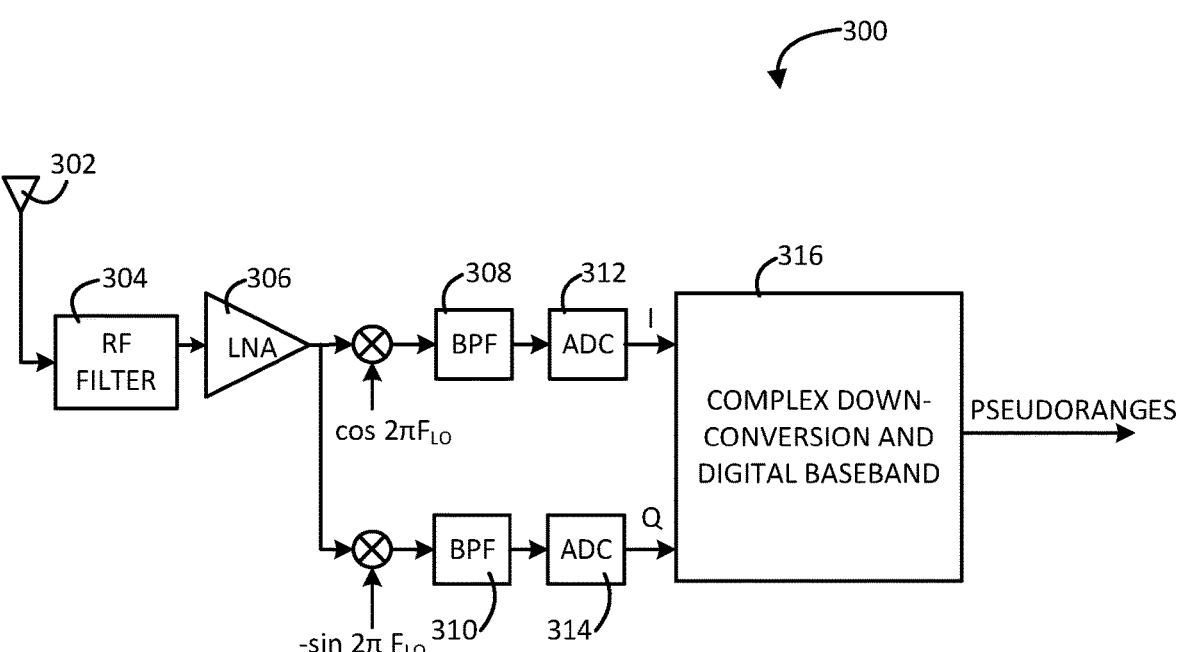
FIG. 3 is a simplified block diagram of an example signal processing architecture that may be used in a GNSS receiver, according to an embodiment.

FIG. 3 illustrates a simplified block diagram of an example signal processing architecture 300 that may be used in a GNSS receiver (e.g., GNSS receiver 210 of FIG. 2, which again may be incorporated into a mobile device 105 of FIG. 1) to implement GNSS signal acquisition and tracking, and determine pseudo-ranges (range measurements) for GNSS-based positioning. This signal processing architecture 300 may be implemented in hardware and/or software components of a GNSS receiver, such as the GNSS receiver 1080 of FIG. 10, which is described in more detail hereafter. The signal processing architecture 300 processes two GNSS signals, $GNSS_1$ and $GNSS_2$, by mixing the received signals with a local oscillator (LO) signal having a frequency $F_{LO}$ that is determined based, at least in part, on first and second carrier frequencies $f_1$ and $f_2$. As shown in FIG. 3, according to a particular implementation, signal processing architecture 300 may receive signals $GNSS_1$ and $GNSS_2$ at a single radio frequency RF antenna 302, a bandpass RF filter 304 such as surface acoustic wave (SAW) filter and low-noise amplifier 306. The received GNSS signals may then be complexly down-converted to intermediate frequencies by mixing the received signals with the LO signal as shown.

In this context, a "down-conversion" may relate to transforming an input signal having a first frequency characteristic to an output signal having second frequency characteristic. In one particular implementation, although claimed subject matter is not limited in this respect, such a down-conversion may comprise transformation of a first signal to a second signal, where the second signal has a frequency characteristic of a lower frequency than that of the first signal. Here, in particular examples, such a down-conversion may comprise transformation of an RF signal to an intermediate frequency (IF) signal, or transformation of an IF signal to a baseband signal and/or baseband information. However, these are merely examples of a down-conversion and claimed subject matter is not limited in this respect.

In a particular implementation, by selecting $F_{LO}$ at about a midpoint between $f_1$ and $f_2$, portions of signals down-converted from signals received from components 302 and 304 may substantially covered by bandpass filters 308 and 310. Here, for example, a selection of a particular frequency for $F_{LO}$ may result in an image frequency component of one down-converted GNSS signal that may substantially overlapping a desired signal component of another down-converted GNSS signal. In particular embodiments, impacts of such overlapping can be avoided without attenuating image frequency components before mixing with LO. It should be understood, however, that in other implementations $F_{LO}$ may be selected to be somewhere other than about a midpoint between $f_1$ and $f_2$, and claimed subject matter is not limited in this respect.

In-phase (I) and quadrature (Q) components filtered by associated band-pass filters (BPFs) 308 and 310 may then be digitally sampled at analog to digital conversion circuits (ADCs) 312 and 314 to provide digitally sampled in-phase and quadrature components for further processing (e.g., acquisition and/or tracking as described herein). Here, ADCs 312 and 314 may be adapted to sample output signals of BPFs 308 and 310 at or above the Nyquist rate of the combined signal. Also, the presently illustrated implementation includes ADCs 312 and 314 between first and second down-conversion stages. It should be understood, however, that other architectures may be implemented without deviating from claimed subject matter. In other implementations, for example, analog to digital conversion may occur following a second down-conversion. Again, these are merely example implementations and claimed subject matter is not limited in these respects.

Also, in alternative implementations, ADCs 312 and 314 may be replaced with a single complex ADC or with a single time shared and/or multiplexed ADC with appropriate delays to be shared between in-phase and quadrature signal paths.

In particular implementations, $GNSS_1$ and/or $GNSS_2$ may comprise any one of several pairs of different GNSS signals. In one particular embodiment, although claimed subject matter is not limited in this respect, $GNSS_1$ and $GNSS_2$ may be selected such that $f_1$ and $f_2$ are near in frequency to enable low-cost manufacture of RF filter 304 (e.g., a SAW filter) and/or low-noise amplifier (LNA) 306 by limiting an operating band. While $GNSS_1$ and $GNSS_2$ may be selected such that $f_1$ and $f_2$ are near in frequency (e.g., both being in an L1 band or both being in an L2 band) as illustrated above in particular embodiments, claimed subject matter is not limited in this respect. In alternative embodiments, GNSS signals transmitted at more greatly separated carrier frequencies may be down-converted to a common intermediate frequency in a single receiver channel as illustrated above. In one particular example, an SV in a GNSS constellation may transmit multiple GNSS signals at different carrier frequencies and/or frequency bands such as, for example, L1 and L2 frequency bands.

In particular embodiments, the bandwidth of BPFs 308 and 310 may be centered at about a common intermediate frequency $IF_o$ to process portions of GNSS signals received from both $GNSS_1$ and $GNSS_2$. In addition, the bandwidth of BPFs 308 and 310 may be implemented to be wide enough to capture enough information GNSS signals received from both $GNSS_1$ and $GNSS_2$ without introducing significant noise outside the bands of spectra of components 302 and 304. Additionally, BPFs 308 and 310 may be chosen to be narrow enough to enable sampling by ADCs 312 and 314 at a given sample rate (e.g., at about the Nyquist rate) without significant distortion.

According to particular implementations, sampled in-phase and quadrature components provided by ADCs 312 and 314 may be further processed according to a complex down-conversion and digital baseband 316, can be used to generate in-phase and quadrature components, and output pseudoranges derived from the GNSS signals. According to some embodiments, the output of the complex down-conversion and digital baseband 316 may more broadly be referred to as a measurement, where the measurement may comprise a pseudorange, or a pseudorange and carrier phase.

Components from the RF antenna 302 to digital conversion at ADCs 312 and 314 may be referred to herein as an "RF front-end" and/or "analog front-end." As noted, the signal processing architecture 300 may be capable of processing multiple frequencies with a single RF antenna 302 and/or a single set of analog front-end components. To process other frequencies, a GNSS receiver may have multiple signal processing architectures 300 to be able to process GNSS satellite signals in multiple frequency bands/ or from multiple GNSS constellations. For example, a GNSS receiver (e.g., GNSS receiver 210) may include a first signal processing architecture to process bands L1 and L2, and a second signal processing architecture to process band L5. In some embodiments, a GNSS receiver may include different analog front-end components for different bands (some of which may be shared, as in the case of GPS L1 and L2) and may share a single digital processing chip and/or digital processing structure to perform the complex down-conversion and digital baseband processing shown by block 316. Some embodiments may have separate digital processing circuitry.

The pseudoranges output by the architecture illustrated in FIG. 3 are used to determine a location of the GNSS receiver (and/or device, vehicle, etc. into which the GNSS receiver integrated or with which the GNSS receiver is co-located). Because the pseudoranges used for a position estimate are dependent on signals received from GNSS satellites, phenomena that impact signal quality may adversely impact a position estimate determined by the GNSS receiver. For example, in dense urban areas, the signals may reflect from buildings one or more times before reaching the GNSS receiver. Because, the signal takes a longer path to reach the receiver, and the GNSS receiver does not know the signal path, the GNSS receiver might estimate its position further from the satellite because of the additional delay. Additionally or alternatively, a signal may experience multipath, in which the same signal from the satellite might reach the GNSS receiver through multiple paths (reflections or direct path plus reflections). These mixed signals can cancel each other and cause faulty measurements of the GNSS receiver distance to the satellite. Ultimately, first fix (e.g., an initial position fix from acquired satellite signals and navigation data) and continuous positioning may degrade significantly in urban areas, which can cause a horizontal positioning error of up to 20 times larger than under open sky. As GNSS receiver localization suffers from inaccuracies, service quality degrades for location-based services on mobile devices (like ride-sharing applications) in urban areas. Further, traditional techniques for addressing this problem, such as using a 3D map of the area can present significant challenges and may consume a large amount of communication and/or processing resources.

As previously noted, embodiments may address these and other issues by performing an optimization of residuals (and/or weights) to provide an improved position estimate from an initial position estimate. Such as position estimates are described in more detail with regard to FIG. 4.

Figure 4:
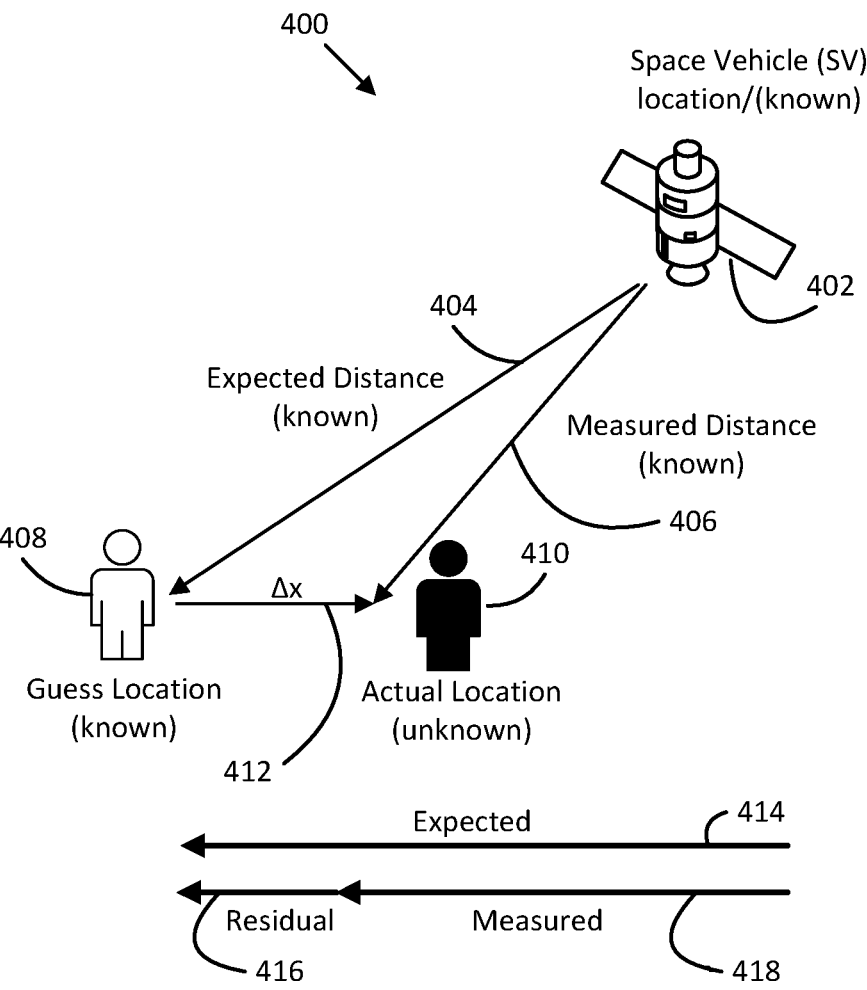
FIG. 4 is a diagram that depicts an example situation in which GNSS signals are used to determine an improved position of a mobile device.

FIG. 4 is a diagram of a system 400 that depicts a situation using GNSS satellite signals (that travel distances 404, 406) to find an improved position 410 of mobile device of a user by determining correction Δx 412. As illustrated, a GNSS satellite 402 transmits a signal that has a measured distance 406 (e.g., as measured by the GNSS receiver of the mobile device) that indicates an actual location 410 of the mobile device. This measured distance 406 is not completely accurate as compared to an expected distance 404 that indicates a guess location 408 of the GNSS receiver (e.g., an initial position estimate, which may be determined without using GNSS measurements). A difference Δx 412 (e.g., correction to the guess location 408) represents a difference between the guess location 408 and the actual location 410.

Arrows 414-418 illustrate further illustrate how a residual is determined from a difference in expected distance 404 and measured distance 406. An expected distance arrow 414 (corresponding to expected distance 404) indicates the expected distance that would be measured at the guess location 408, measured distance arrow 418 indicates the distance that was actually measured by the GNSS receiver of the mobile device (e.g., at the actual location 410), and a residual arrow 416 indicates a difference between the expected distance arrow 414 and the measured distance arrow 418.

Here, measured distances to the satellites may be input to a Weighted Least Squares (WLS) algorithm to determine correction Δx as follows:

$$\Delta x = \left(H^T W H\right)^{-1} H^T W r, \qquad \text{(Eqn. 1)}$$

where residual, r, is a difference between measured distances and expected distances at a guess location; weight, W, represents the importance of each measurement; And information about a satellite's position in the sky is represented by H. Once correction Δx is determined, it may be applied to the guess location (e.g., guess location 408 of FIG. 4) to obtain an improved location (e.g., closer to actual location 410). The WLS algorithm may find Ax by running iteratively until convergence (corrections become small). Embodiments herein may provide for a more accurate determination of Ax by performing an optimization to find optimal residuals and/or optimal weights for the WLS algorithm, for a given set of GNSS measurement errors.

Figure 5:
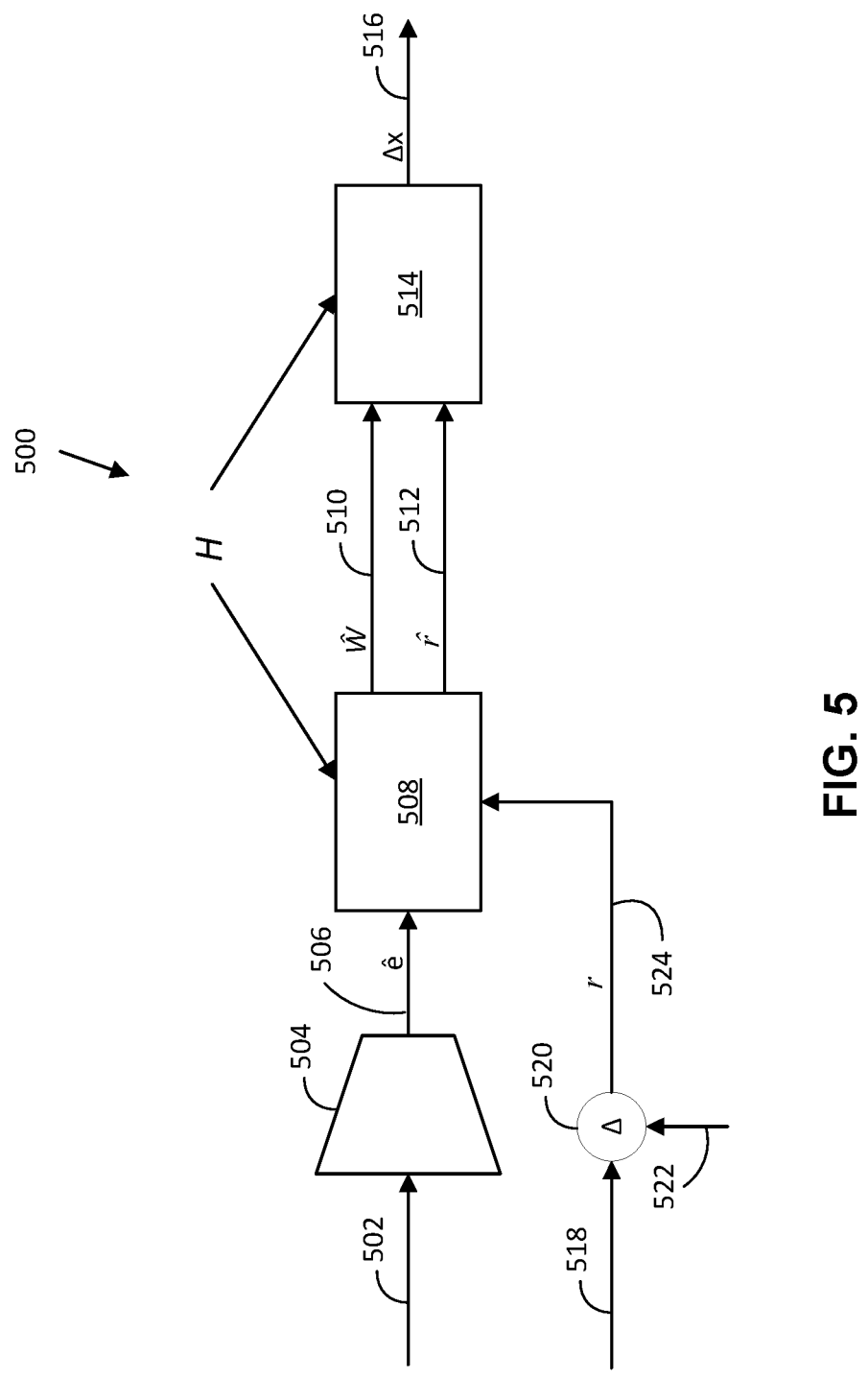
FIG. 5 is a diagram of an example system for determining an improved position of a mobile device.

FIG. 5 is a diagram of an example system 500 that determines and uses optimized residuals or, in alternative embodiments, optimized weights to calculate a more accurate value for Δx 516, resulting in a more accurate determination of the position estimate (e.g., improved location) of a mobile device over traditional techniques that use non-optimized residuals and non-optimized weights. As explained in more detail below, the estimated optimal residuals/weights may be derived using the Eqn. 1 and estimated GNSS measurement errors. The system 500 may be executed by hardware and/or software components of a GNSS positioning engine, which may be implemented in the GNSS receiver and/or application processors of a mobile device, as described below.

The example system 500 receives satellite features and signal feature inputs 502 into a machine learning model 504. The satellite features and signal feature inputs 502 such as Carrier power to Noise ratio of the satellite signal (CN/0) and elevation) may be from one or more GNSS satellites from which GNSS measurements are made. The machine learning model 504 determines errors (ê) 506 (e.g., better estimated actual errors) of the GNSS measurements based on the satellite features and signal feature inputs 502. In particular, the machine learning model 504 may comprise a model developed to predict the error in the measured distance to satellites by using information from the signal and satellite constellations as input. (This distance measurement error may be computed from atomic clock accurate hardware for example.) To do so, the machine learning model may be trained using ground truth measurement error to estimate errors at inference. The machine learning model may comprise, for example, a neural network, although other machine learning models may be used. Moreover, in some embodiments, additional or alternative algorithms may be used for determining errors (ê) 506 (or non-optimized errors) that may or may not involve machine learning. As described in more detail below, according to some embodiments, errors determined by the machine learning model 504 (and/or other such algorithms) may be used for filtering certain GNSS measurements used for determining the value for Δx and corresponding improved position estimate.

In another embodiment of the system, the machine learning model 504 determines estimated errors at inference time. This is an estimate because at inference time an atomic clock accurate hardware (e.g. on a mobile phone) is not available. For the machine learning model 504 to learn to estimate the errors at inference, it may be trained by feeding in the inputs 502 and forcing the machine learning model 504 to output actual (truth) errors. The actual errors may be collected with the use of atomic clock accurate hardware (for training purposes). After the machine learning 504 is trained with this accurate data, it goes into the mobile phone. At inference time, inputs 502 are input on the run so that output errors that are close to actual errors are now output.

The example system 500 further includes a difference generator 520 that calculates a difference between distances traveled by an RF signal. In particular, difference generator 520 determines the difference between a measured distance 518 (e.g., pseudorange, which may correspond with arrows 406 and 418 of FIG. 4) and an expected distance 522 (e.g., corresponding to arrows 404 and 414 of FIG. 4), which may be obtained by the GNSS receiver as previously indicated. The difference generator 520 determines a residual I (e.g., difference, as indicated by arrow 416 of FIG. 4).

In one embodiment, the errors (ê) 506 output from the machine learning model 504 and the residual (r) output from the difference generator 520 are input to a WLS Input Optimizer (WIO) 508. In one configuration, the WIO 508 performs an optimization using the initial residuals r 524 and the errors (ê) 506 to produce a modified set of residuals r̂ 512 (e.g., optimized residuals) and weights ŵ 510 (e.g., optimized weights). As indicated in more detail below, the optimization may optimize for residuals or weights, and thus, the modified set of residuals and weights may include either modified/optimized residuals or modified/optimized weights. The optimization may further be based on H, where H represents a position of the GNSS satellites. The optimization performed by the WIO may be based on determining optimal residuals r̂ or weights ŵ for Eqn. 1, which are then provided to the WLS block 514.

At its core, WLS the objective is to find the location that minimizes the weighted sum of residuals:

$$w0r0^2 + w1r1^2 + w2r2^2 \dots , \qquad \text{(Eqn. 2)}$$

where, for a distance $d_i$ from location x to satellite i and measured distance $m_i$ to satellite i, $r_i$ is the residual—$(m_i-d_i)$. In addition to optimizing position (XYZ), WLS also optimizes the time biases between the user device and the constellations used in the triangulation (in case of GPS constellation only, XYZ+time). Thus an optimization to determine optimal residuals r̂ and/or weights r̂ may comprise setting a derivative with respect to location to zero:

$$2w0r0\frac{\partial r0}{\partial x} + 2w1r1\frac{\partial r1}{\partial x} + 2w2r2\frac{\partial r2}{\partial x} \dots = 0, \text{ or} \qquad \text{(Eqn. 3)}$$

$$H_{x,0}w0r0 + H_{x,1}w1r1 + H_{x,2}w2r2 \dots = 0$$

where, where matrix H is known. In vector form:

$$H^T Wr = 0 \qquad \text{(Eqn. 4)}$$

$$H^T W(M - D(x)) = 0$$

$$H^T W(D(gt) + e - D(x)) = 0$$

Here, ground truth location may be the solution. Thus, the measurement error e may be reduced from the measurements. The modified (e.g., optimized) residuals 512 from the WIO 508 may comprise the difference between residuals 524 and estimated measurement error ê 506.

As shown in FIG. 5, the outputs from the WIO 508 comprising the modified set of residuals r̂ 512 and weights ŵ 510 may be input to a weighted least squares (WLS) block 514. The WLS block 514 uses this input and geometry of the GNSS satellites (H) to determine an improved position of the device by calculating correction Δx 516 (e.g., using Eqn. 1 above). When modified/optimized residuals are determined, uniform weights w may be used.

Figure 6:
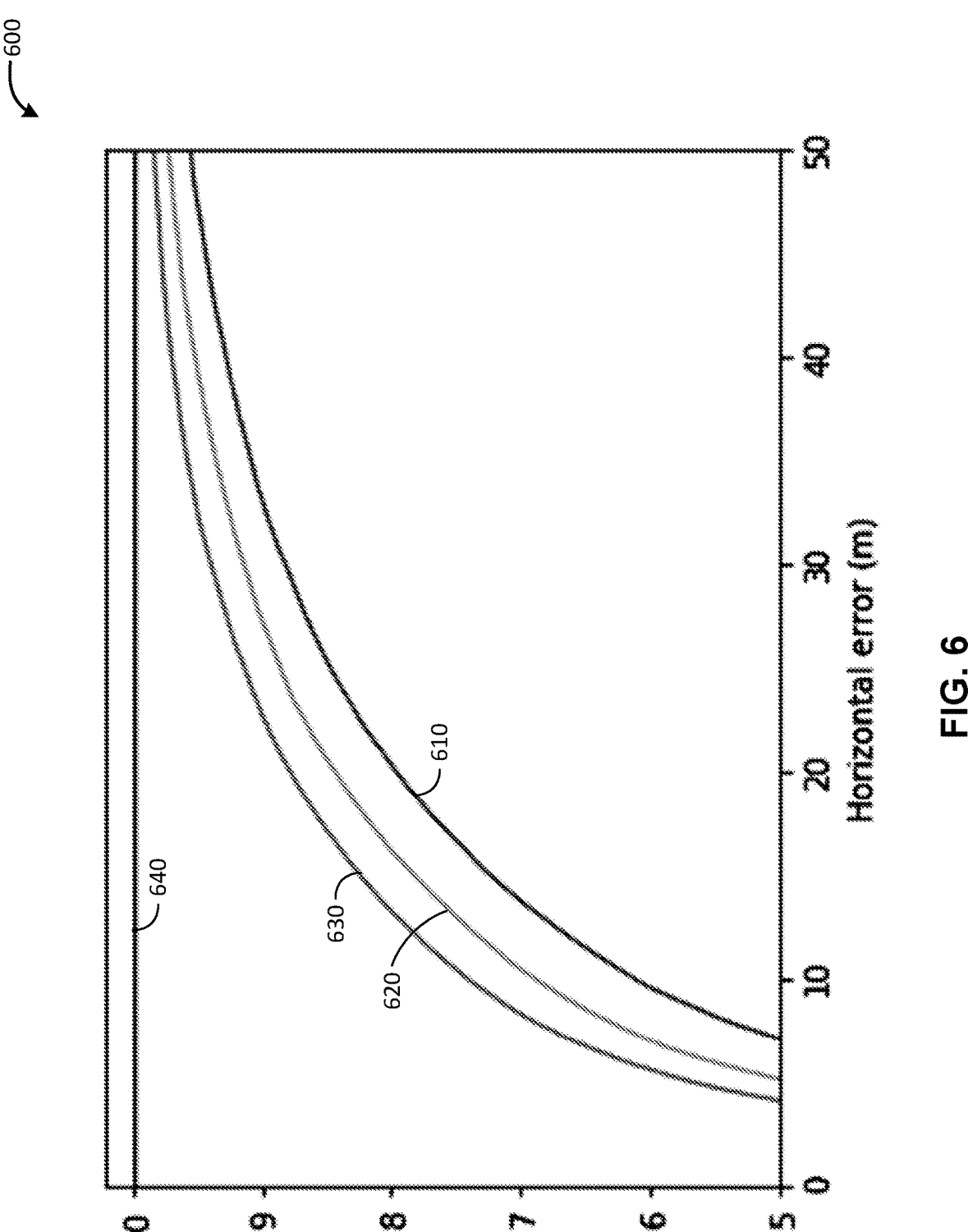
FIG. 6 is an illustration of a graph showing performance improvements that the example system may provide over existing technologies, according to an example.

FIG. 6 is an illustration of a graph 600 showing performance improvements that the example system 500 may provide over existing technologies, when the WIO 508 performs an optimization to determine modified/optimized residuals. Using a large sample of obtained measurements, a cumulative distribution function (CDF) is plotted over horizontal error for: (1) techniques using uniform weights (no correction), shown by curve 610; (2) techniques in which measurements with high estimated error are simply removed, shown by curve 620; (3) the solution discussed above (e.g., as shown FIG. 5) in which estimated error is used to correct residuals, shown by curve 630; and (4) the theoretical limit using ground truth measurement errors (which is not available on a mobile device, but shown as a reference), shown by line 640. The improvements in horizontal error in curve 630 over traditional techniques may be attributed, for example, to the WIO block 514 of FIG. 5, in which modified/optimized residuals r̂ 512 are determined (e.g., rather than simply performing WLS using residuals 524 and weighted measurements, which may be implemented in traditional techniques.)

As noted above, the modified set of residuals r̂ 512 and weights ŵ 510 output by the WIO may alternatively include optimized/modified values for weights. That is, using H and e in the set of equations provided above values for weights may be determined using Gauss-Jordan elimination and produce an optimal set of weights that are a function of measurement error e.

In some alternate embodiments, the WIO 508 may not perform an optimization on either the initial residuals r 524 or the errors (ê) 506 and will not produce modified residuals r̂ 512 or weights ŵ 510. In some configurations, the WIO 508 may perform an optimization using the initial residuals r 524 and the errors (ê) 506 to produce modified residuals r̂ 512 only and will not produce weights ŵ 510. In another configuration, as known by those of ordinary skill in the art, the WIO 508 may perform an optimization using the initial residuals r 524 and/or the errors (e) 506 to produce weights ŵ 510 and/or modified residuals r̂ 512.

According to some embodiments, the example system 500 may provide Δx 516 and/or the improved position of the device in any of a variety of ways. For example, the example system 500 may provide Δx 516 and/or the improved position of the device to an operating system or application of the device, send Δx 516 and/or the improved position of the device to an application processor and/or another device, provide Δx 516 and/or the improved position of the device to a graphical user interface and/or other output for display (e.g., to a user of the device), or perform any combination of these operations.

In some configurations, the example system 500 may filter the GNSS measurements to select at least the portion of the GNSS measurements. In another embodiment, the example system 500 may determine Δx 516 and a corresponding improved position of the device using, at least in part, a threshold number of satellite measurements. The at least the portion of the GNSS measurements may be a threshold number of satellite measurements needed to determine Δx 516. In other configurations, the system may increase an upper error bound and decrease a lower error bound so that a number of satellite measurements is satisfied. Additional details are provided below with respect to FIG. 7.

Figure 7:
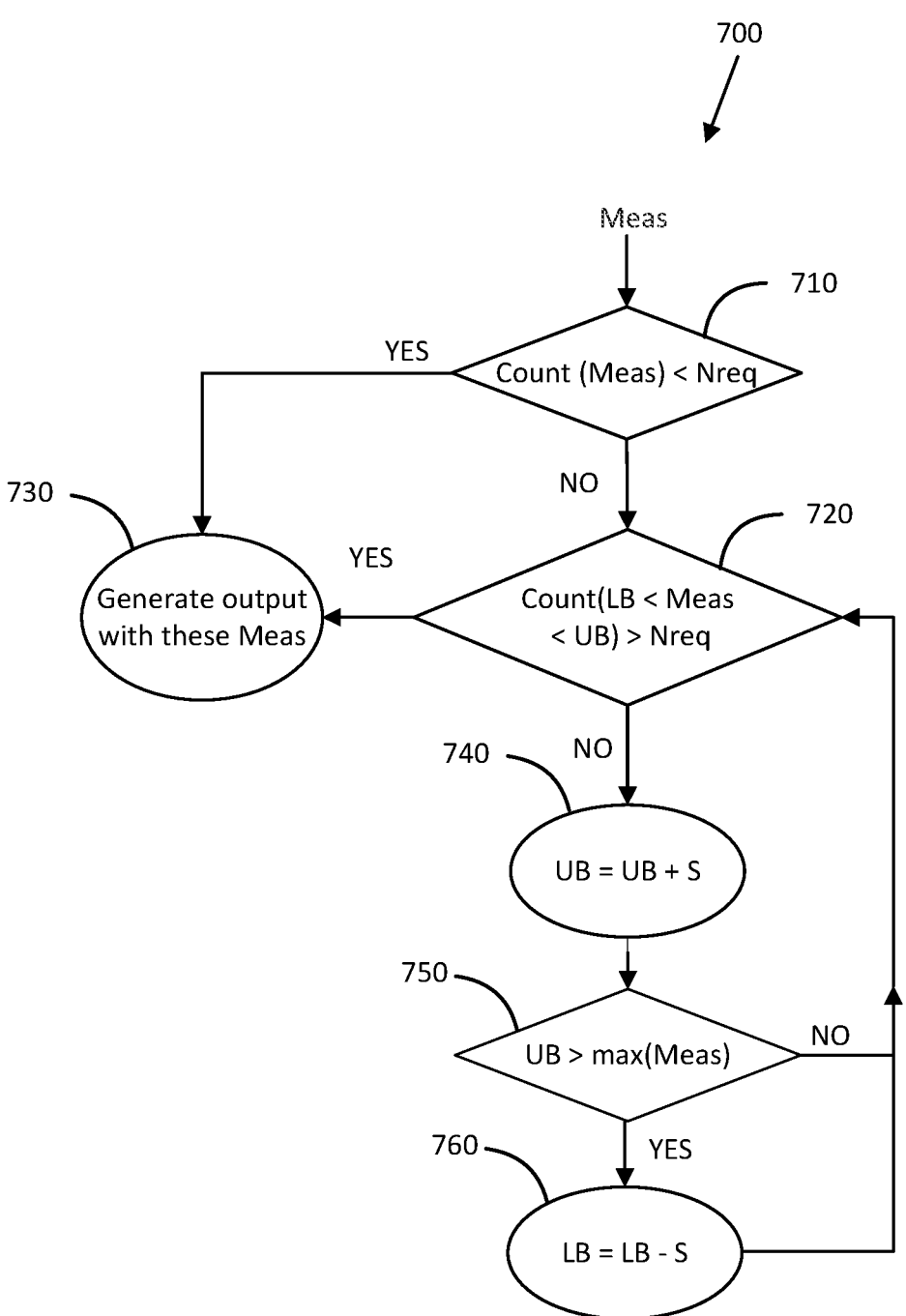
FIG. 7 is a flow diagram of a method of determining which GNSS signals to use based on upper and lower bounds of the GNSS signals.

FIG. 7 is a flow diagram illustrating an example method of filtering GNSS measurements, which may be performed (e.g., in addition to performing the features of the WIO block 514 discussed above) in some embodiments. That is, using errors ê (e.g., provided at arrow 506 of FIG. 5), corresponding GNSS measurements may be omitted or included in the determination of Δx and the improved position of the device, in accordance with the flow 700. The flow 700 begins by receiving a set of GNSS measurements (Meas), 710. A determination is made at block 710 to determine whether a number of the GNSS measurements (Count(Meas)) is less than a threshold number of measurements (Nreq) used to perform filtering. (In some embodiments, Nreq may be 15, although other embodiments may have a higher or lower value for Nreq, depending on desired functionality.) If Count(Meas) is less than Nreq, then the flow proceeds to block 730. At block 730, an output (predicted location) estimate of the device is generated (e.g., using the techniques for determining an improved position estimate, as described above). If Count(Meas) is greater than Nreq, then filtering GNSS measurements can be performed and the flow 700 proceeds to block 720.

At block 720, a determination of whether a number of GNSS measurements for which the errors fall between a lower bound (LB) of error values and an upper bound (UB) of error values (Count(LB<Meas<UB)) exceeds Nreq. According to some embodiments, initial values of LB and UB may be set based on desired or target LB/UB values (e.g., based on a priori and/or empirical data for values that result in a threshold or desired position accuracy). In other embodiments, the LB and UB may change at each time-stamp that measurements are mode. For example, at time t=1 (e.g., 1 fix or 1 epoch), the mobile device may record 50 satellite measurements so that set UB, LB may be set and filtering may be performed based on those bounds. The next time, stamp t=2, the mobile device may record 30 measurements and reset UB and LB may be set to smaller values and then the filtering will be performed with the current set UB and LB values. If Count(LB<Meas<UB) is greater than Nreq, then flow 700 may proceed to block 730 to generate a predicted location value based on the GNSS measurements with error values between LB and UB. Otherwise, the flow 700 may proceed to block 740. At block 740, the UB is increased by a step size value S. The value of S may vary, based on desired functionality. In some embodiments, S may be a static (predetermined value). In some embodiments, S may be a dynamic value based on factors such as error values of GNSS measurements, current values of UB/LB, or the like. The flow 700 then proceeds to block 750, where a determination is made of whether the new value of UB) is greater than a maximum measurement error in the current set of measurements (max(Meas)). If not, the flow returns to block 720. Otherwise, flow 700 then proceeds to block 760 in which the LB is decreased by step size S, and the flow 700 returns to block 720 to again check whether Count (LB<Meas<UB) is greater than Nreq, given the new UB and/or LB values. Thus, the flow 700 may increase bounds UB and LB until a threshold Nreq is exceeded. As shown in FIG. 7 and discussed above, a value of UB may be increased first, before adjusting the value of LB. However, depending on desired functionality, embodiments may instead adjust the values of LB and UB together, or adjust the value of LB first, before adjusting UB.

Figure 8:
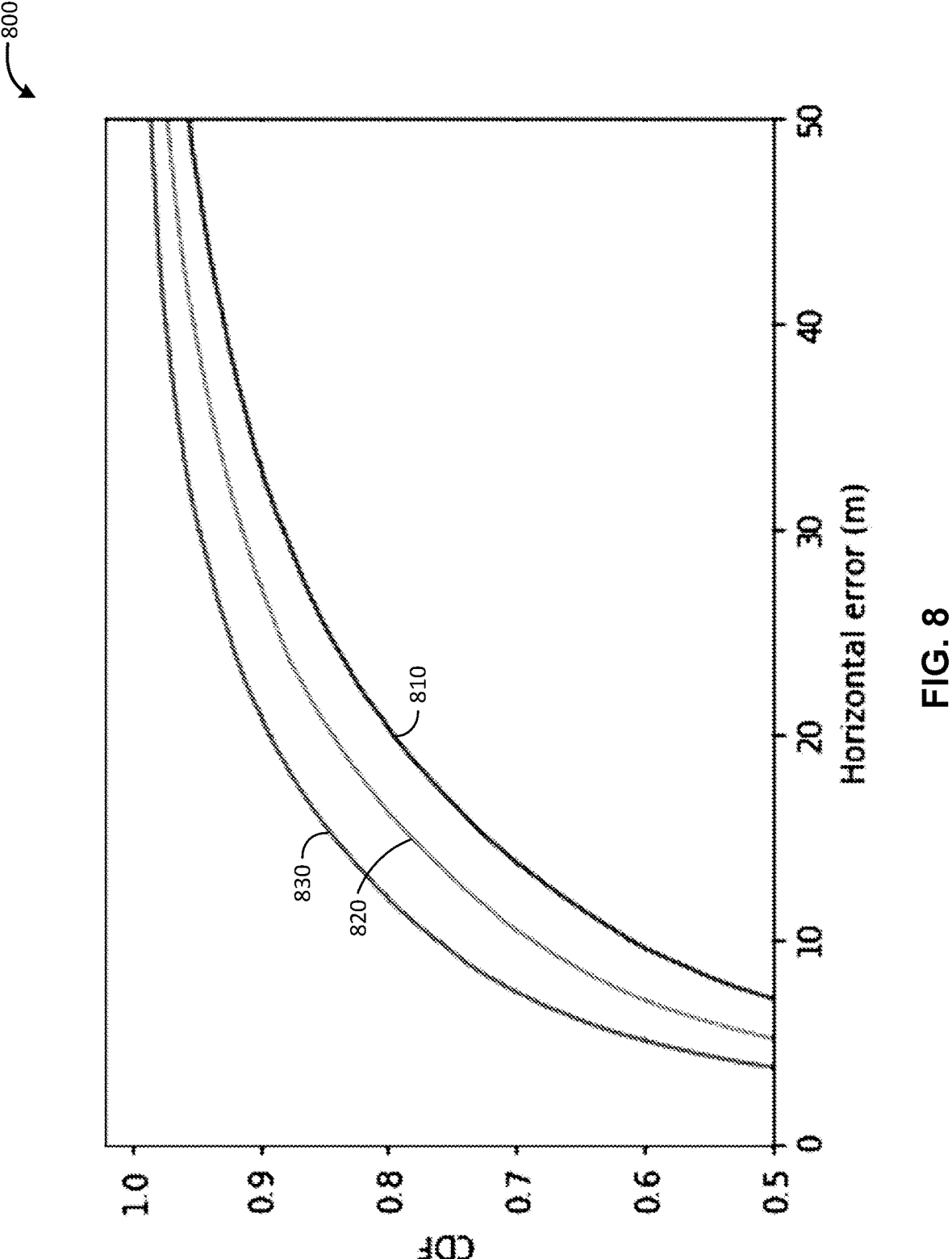
FIG. 8 is an illustration of a graph showing performance improvements using a combination of techniques described herein, according to an example.

FIG. 8 is an illustration of a graph 800 showing performance improvements that embodiments may provide when modified/optimized residuals are determined as provided herein (e.g., as described above with respect to FIGS. 5 and

6) and additional filtering is performed as described with respect to FIG. 7. Similar to FIG. 6, using a large sample of obtained measurements, a CDF is plotted over horizontal error for: (1) techniques using uniform weights (no correction), shown by curve 810; (2) techniques in which measurements with high estimated error are simply removed, shown by curve 820; (3) the solution discussed above in which estimated error is used to correct residuals and filtering is performed in accordance with the diagram of FIG. 7, shown by curve 830. As can be seen, the techniques herein can be used to reduce horizontal error, increasing an accuracy of the position estimate of the device.

Figure 10:
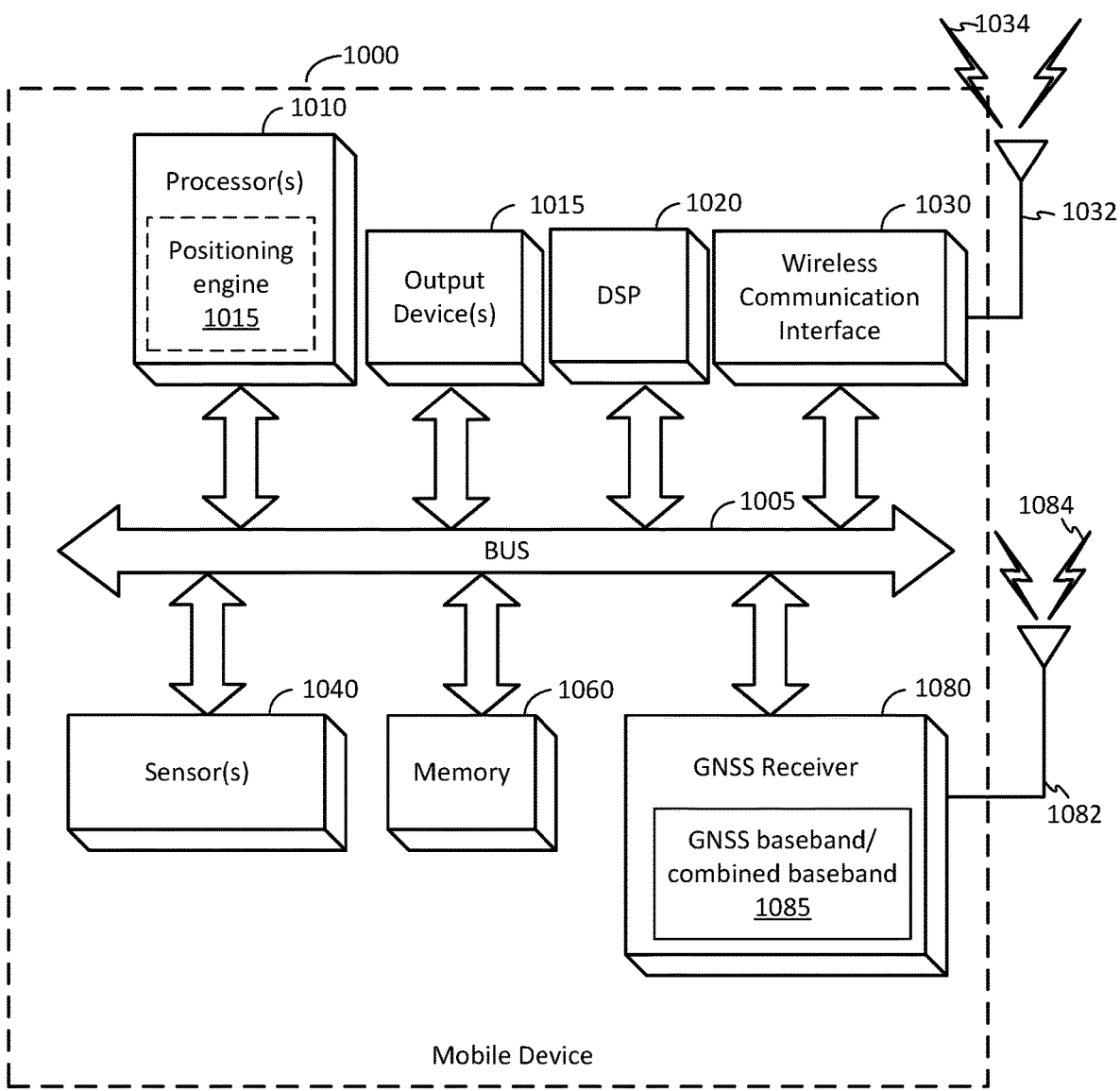
FIG. 10 is a block diagram of an embodiment of a mobile device.

FIG. 9 is a flow diagram of a method 900 of calculating an improved position of a mobile device using GNSS satellites, according to an embodiment. Means for performing the functionality illustrated in one or more of the blocks shown in FIG. 9 may be performed by hardware and/or software components of a GNSS receiver and/or a mobile device utilizing a GNSS receiver. Example components of a mobile device are illustrated in FIG. 10, which is described in more detail below.

The method 900 begins, at 910, by obtaining an initial position of the device without using Global Navigation Satellite System (GNSS) positioning. Specifically, the initial position of the device may be obtained without using GNSS measurements obtained while at the initial position (e.g., GNSS measurements obtained at block 940 described hereafter. The initial position may be obtained using any of a variety of position determination techniques, including, for example, using network-based positioning in a cellular network (e.g., using a base station, non-GNSS satellites, and/or other nodes of the cellular network). Additionally or alternatively, an initial position of the device may be determined using Wi-Fi positioning, dead reckoning (e.g., from a previously-determined position), user input, or any combination thereof. GNSS measurements of RF signals transmitted by GNSS satellites are taken, at 920. In some embodiments, at least a portion of the GNSS measurements includes at least a minimum threshold number of GNSS measurements used to determine the improved position. In other embodiments, the GNSS measurements may be filtered to select the at least the portion of the GNSS measurements. In other alternative embodiments, the method 900 may iteratively increase an upper error bound and/or decrease a lower error bound (e.g., as illustrated in FIG. 7 and described above) so a threshold number of GNSS measurements is satisfied.

Errors of the GNSS measurements are estimated based on the RF signals, at 940. Initial residuals are determined, at 930, based, at least in part, on GNSS measured distances determined from the at least a portion of the GNSS measurements and expected distances determined from the initial position. This may be done, for example, as illustrated in FIGS. 4 and 5, as discussed above. In some embodiments, machine learning may be used (e.g., machine learning model 504 of FIG. 5) to estimate the errors based on the RF signals. An optimization is performed, at 950, using the initial residuals and at least a portion of the errors to produce a modified set of residuals and weights. The optimization is further based on a geometry of the satellites. As noted, the geometry of the GNSS satellites may include a matrix (H) with trigonometric functions of an azimuth and elevation of the GNSS satellites. At 960, a cost minimization method of the modified set of residuals and weights and actual geometry of the GNSS satellites is performed to determine an improved position of the device. As noted herein, the cost minimum method may be based on and/or implement a weighted least squares (WLS) calculation. According to some embodiments, the geometry of the satellites may include a matrix with trigonometric functions of an azimuth and elevation of the satellites.

In some embodiments, the method may also comprise providing the improved position of the device to an operating system or application of the device, sending the improved position to an application processor, sending the improved position to another device, providing the improved position to a graphical user interface for display, or any combination thereof.

Means for performing functionality of any or all of blocks 910-960 may comprise processor(s) 1010, DSP 1020, wireless communication interface 1030, sensor(s) 1040, memory 1060, GNSS receiver 1080 and/or other components of a mobile device 1000 as illustrated in FIG. 10.

FIG. 10 is a block diagram of an embodiment of a mobile device 1000, which can be utilized as described in the embodiments described herein and in association with FIGS. 1-9. For example, the mobile device 1000 can perform one or more of the functions of method 900 of FIG. 9. Further, the mobile device 1000 may correspond with the mobile device as described herein (e.g., mobile device 105 of FIG. 1). It should be noted that FIG. 10 is meant only to provide a generalized illustration of various components of mobile device 1000, any or all of which may be utilized as appropriate. In other words, because devices can vary widely in functionality, they may include only a portion of the components shown in FIG. 10. It can be noted that, in some instances, components illustrated by FIG. 10 can be localized to a single physical device and/or distributed among various networked devices, which may be disposed at different physical locations.

The mobile device 1000 is shown comprising hardware elements that can be electrically coupled via a bus 1005 (or may otherwise be in communication, as appropriate). The hardware elements may include one or more processors 1010 which may comprise without limitation one or more general-purpose processors, one or more special-purpose processors (such as digital signal processing (DSP) chips, graphics acceleration processors, application specific integrated circuits (ASICs), and/or the like), and/or other processing structures, units, or means, which can be configured to perform one or more of the methods described herein. As shown in FIG. 10, some embodiments may have a separate DSP 1020, depending on desired functionality. The mobile device 1000 also may comprise one or more input devices (not shown), which may comprise without limitation one or more touch screens, touch pads, microphones, buttons, dials, switches, and/or the like; and one or more output devices (not shown), which may comprise without limitation, one or more displays, light emitting diodes (LEDs), speakers, and/or the like.

The mobile device 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the mobile device 1000 to communicate via the networks described herein with regard to FIG. 1. The wireless communication interface 1030 may permit data to be communicated with a network, base stations (e.g., eNBs, ng-eNBs, and/or gNBs), and/or other network components, computer systems, transmission/reception points (TRPs), and/or any other electronic devices described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1000 may communicate with different data networks that may comprise various network types. As previously noted, a WWAN may be a CDMA network, a TDMA network, a FDMA network, an OFDMA network, a SC-FDMA network, a WiMAX (IEEE 802.16), and so on. 5G, LTE, LTE Advanced, NR, GSM, and WCDMA are described in documents from 3GPP. Again, a WLAN may also be an IEEE 802.11x network, and a WPAN may be a Bluetooth network, an IEEE 802.15x, or some other type of network.

The mobile device 1000 can further include sensor(s) 1040. Such sensors may comprise, without limitation, one or more inertial sensors, radar, LIDAR, sonar, accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the position estimation functionality described herein.

Embodiments of the mobile device 1000 may also include a GNSS receiver 1080 capable of receiving signals 1084 from one or more GNSS satellites via one or more GNSS bands using a GNSS antenna 1082 (which may be combined in some implementations with an antenna(s) 1032). To do so, the GNSS receiver 1080 may comprise the signal processing architecture 300 of FIG. 3 and/or similar processing components, which may be implemented in a GNSS baseband/combined baseband block 1085. As previously noted, the signal processing architecture 300 may be used to process signals received from a single GNSS band or two GNSS bands having similar baseband frequencies. As such, the GNSS receiver 1080 may comprise many signal processing architectures similar to the signal processing architecture 300 of FIG. 3 to be capable of processing signals received via many GNSS bands/constellations. In some embodiments, the GNSS receiver 1080 may include front-end analog components for each GNSS band (or for pairs of GNSS bands having similar baseband frequencies), and may share digital circuitry (e.g., complex down-conversion and digital baseband 316) among multiple GNSS bands. Additionally or alternatively, digital circuitry may be separate for each GNSS band. According to some embodiments, some or all aspects of the system 500 of FIG. 5 may be implemented by the GNSS receiver 1080 and/or processor(s) 1010.

The GNSS receiver 1080 can extract a position of the mobile device 1000, using conventional techniques, from GNSS satellites of a GNSS system, such as GPS, Galileo, LONASS, Compass, Quasi-Zenith Satellite System (QZSS) over Japan, Indian Regional Navigational Satellite System (IRNSS) over India, Beidou over China, and/or the like.

Moreover, the GNSS receiver 1080 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. Additionally or alternatively, as indicated in FIG. 10, at least some aspects of a positioning engine may also be executed by one or more processors, such as processor(s) 1010 (as shown by block 1015) or DSP 1020.

The mobile device 1000 may further include and/or be in communication with a memory 1060. The memory 1060 may comprise, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the mobile device 1000 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 1000 (e.g., using processor(s) 1010). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

As used herein, the terms "mobile device" and "User Equipment" (UE) may be used interchangeably and are not intended to be specific or otherwise limited to any particular Radio Access Technology (RAT), unless otherwise noted. In general, a mobile device and/or UE may be any wireless communication device (e.g., a mobile phone, router, tablet computer, laptop computer, tracking device, wearable (e.g., smartwatch, glasses, Augmented Reality (AR)/Virtual Reality (VR) headset, etc.), vehicle (e.g., automobile, vessel, aircraft motorcycle, bicycle, etc.), Internet of Things (IoT) device, etc.), or other electronic device that may be used for Global Navigation Satellite Systems (GNSS) positioning as described herein. According to some embodiments, a mobile device or UE may be used to communicate over a wireless communications network. A UE may be mobile or may (e.g., at certain times) be stationary, and may communicate with a Radio Access Network (RAN). As used herein, the term UE may be referred to interchangeably as an Access Terminal (AT), a client device, a wireless device, a subscriber device, a subscriber terminal, a subscriber station, a user terminal (UT), a mobile device, a mobile terminal, a mobile station, or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting,"

"maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform ("e.g., included as part of a processing circuit or external to such a processing circuit"). Further, unless specifically stated otherwise, processes described herein, with reference to flow diagrams or otherwise, may also be executed and/or controlled, in whole or in part, by such a computing platform.

A "space vehicle" (SV) as referred to herein, relates to an object that is capable of transmitting signals to receivers on the earth's surface. In one particular example, such a SV may comprise a geostationary satellite. Alternatively, a SV may comprise a satellite traveling in an orbit and moving relative to a stationary position on the earth. However, these are merely examples of SVs and claimed subject matter is not limited in these respects. SVs also may be referred to herein simply as "satellites."

A "location," as referred to herein, relates to information indicative of the whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects.

Location determination techniques described herein may be used for various wireless communication networks such as a wireless wide area network (WWAN), a WLAN, a wireless personal area network (WPAN), and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more RATs such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named 3rd Generation Partnership Project (3GPP). Cdma2000 is described in documents from a consortium named 3rd Generation Partnership Project 2 (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses.

Clause 1: A method of determining a position of a device comprising: obtaining an initial position of the device without using Global Navigation Satellite System (GNSS) positioning; taking GNSS measurements of radio frequency (RF) signals transmitted by GNSS satellites; determining initial residuals based, at least in part, on GNSS measured distances determined from the at least a portion of the GNSS measurements and expected distances determined from the initial position; estimating errors of the GNSS measurements, based at least in part, on the initial residuals and RF signals; performing an optimization using the initial residuals and at least a portion of the errors to produce a modified set of residuals, wherein the optimization is further based on a geometry of the GNSS satellites; and using a cost minimization method of the modified set of residuals and the geometry of the GNSS satellites to determine an improved position of the device.

Clause 2: The method of determining the position of the device of clause 1, wherein the cost minimization method is based on a weighted least squares (WLS) calculation.

Clause 3: The method of determining the position of the device of any one of clauses 1-2 wherein estimating the errors of the GNSS measurements further comprises using machine learning to estimate the errors based on the RF signals.

Clause 4: The method of determining the position of the device of any one of clauses 1-3 further comprising using a base station of a terrestrial network to obtain the initial position of the device.

Clause 5: The method of determining the position of the device of any one of clauses 1-4 further comprising filtering the GNSS measurements to select the at least the portion of the GNSS measurements.

Clause 6: The method of determining the position of the device of clause 5 wherein the at least the portion of the GNSS measurements comprises at least a minimum threshold number of GNSS measurements used to determine the improved position.

Clause 7: The method of determining the position of the device of any one of clauses 1-6 further comprising iteratively increasing an upper error bound, iteratively decreasing a lower error bound, or both, so a threshold number of GNSS measurements is satisfied.

Clause 8: The method of determining the position of the device of any one of clauses 1-7 further comprising providing the improved position of the device to an operating system or application of the device; sending the improved position to an application processor; sending the improved position to another device; providing the improved position to a graphical user interface for display; or any combination thereof.

Clause 9: The method of determining the position of the device of any one of clauses 1-8 wherein the geometry of the GNSS satellites includes a matrix with trigonometric functions of an azimuth and elevation of the GNSS satellites.

Clause 10: A device comprising: a memory; and one or more processors communicatively coupled with the memory, wherein the one or more processors are configured to: obtain an initial position of the device without using Global Navigation Satellite System (GNSS) positioning; take GNSS measurements of radio frequency (RF) signals transmitted by GNSS satellites; determine initial residuals based, at least in part, on GNSS measured distances determined from the at least a portion of the GNSS measurements and expected distances determined from the initial position; estimate errors of the GNSS measurements, based at least in part, on the initial residuals and RF signals; perform an optimization using the initial residuals and at least a portion of the errors to produce a modified set of residuals, wherein the optimization is further based on a geometry of the GNSS satellites; and use a cost minimization method of the modified set of residuals and the geometry of the GNSS satellites to determine an improved position of the device.

Clause 11: The device of clause 10, wherein one or more processors are configured to use the cost minimization method based on a weighted least squares (WLS) calculation.

Clause 12: The device of any one of clauses 10-11 wherein, to estimate the errors of the GNSS measurements, the one or more processors are configured to use a machine learning model to estimate the errors based on the RF signals.

Clause 13: The device of any one of clauses 10-12 wherein the one or more processors are further configured to: obtain the initial position of the device from a base station of a terrestrial network to.

Clause 14: The device of any one of clauses 10-13 wherein the one or more processors are further configured to: filter the GNSS measurements to select the at least the portion of the GNSS measurements.

Clause 15: The device of clause 14 wherein, to select the at least the portion of the GNSS measurements, the one or more processors are configured to select at least a minimum threshold number of GNSS measurements to determine the improved position.

Clause 16: The device of any one of clauses 10-15 wherein the one or more processors are further configured to: iteratively increase an upper error bound, iteratively decrease a lower error bound, or both, so a threshold number of GNSS measurements is satisfied.

Clause 17: The device of any one of clauses 10-16 wherein the one or more processors are further configured to: provide the improved position of the device to an operating system or application of the device; send the improved position to an application processor; send the improved position to another device; provide the improved position to a graphical user interface for display; or any combination thereof.

Clause 18: The device of any one of clauses 10-17 wherein the geometry of the GNSS satellites includes a matrix with trigonometric functions of an azimuth and elevation of the GNSS satellites.

Clause 19: An apparatus for determining a position of a device comprising: the apparatus comprising: means for obtaining an initial position of the device without using Global Navigation Satellite System (GNSS) positioning; means for taking GNSS measurements of radio frequency (RF) signals transmitted by GNSS satellites; means for determining initial residuals based, at least in part, on GNSS measured distances determined from the at least a portion of the GNSS measurements and expected distances determined from the initial position; means for estimating errors of the GNSS measurements, based at least in part, on the initial residuals and RF signals; means for performing an optimization using the initial residuals and at least a portion of the errors to produce a modified set of residuals, wherein the optimization is further based on a geometry of the GNSS satellites; and means for using a cost minimization method of the modified set of residuals and the geometry of the GNSS satellites to determine an improved position of the device.

Clause 20: The apparatus of clause 19, wherein the cost minimization method is based on a weighted least squares (WLS) calculation.

Clause 21: The apparatus of any one of clauses 19-20 wherein the means for estimating the errors of the GNSS measurements further comprises means for using machine learning to estimate the errors based on the RF signals.

Clause 22: The apparatus of any one of clauses 19-21 further comprising means for using a base station of a terrestrial network to obtain the initial position of the device.

Clause 23: The apparatus of any one of clauses 19-22 further comprising means for filtering the GNSS measurements to select the at least the portion of the GNSS measurements.

Clause 24: The apparatus of any one of clauses 19-23 further comprising means for iteratively increasing an upper error bound, iteratively decreasing a lower error bound, or both, so a threshold number of GNSS measurements is satisfied.

Clause 25: The apparatus of any one of clauses 19-24 further comprising means for providing the improved position of the device to an operating system or application of the device; means for sending the improved position to an application processor; means for sending the improved position to another device; means for providing the improved position to a graphical user interface for display; or any combination thereof.

Clause 26: A non-transitory computer-readable medium storing instructions for determining a position of a device comprising: the instructions comprising code for: obtaining an initial position of the device without using Global Navigation Satellite System (GNSS) positioning; taking GNSS measurements of radio frequency (RF) signals transmitted by GNSS satellites; determining initial residuals based, at least in part, on GNSS measured distances determined from the at least a portion of the GNSS measurements and expected distances determined from the initial position; estimating errors of the GNSS measurements, based at least in part, on the initial residuals and RF signals; performing an optimization using the initial residuals and at least a portion of the errors to produce a modified set of residuals, wherein the optimization is further based a geometry of the GNSS satellites; and using a cost minimization method of the modified set of residuals and the geometry of the GNSS satellites to determine an improved position of the device.

Clause 27: The computer-readable medium of clause 28, wherein the code for estimating the errors of the GNSS measurements comprises code for using machine learning to estimate the errors based on the RF signals.

Clause 28: The computer-readable medium of any one of clauses 26-27 wherein the instructions further comprise code for: using a base station of a terrestrial network to obtain the initial position of the device.

Clause 29: The computer-readable medium of any one of clauses 26-28 wherein the instructions further comprise code for: filtering the GNSS measurements to select the at least the portion of the GNSS measurements.

Clause 30: The computer-readable medium of any one of clauses 26-29 wherein the instructions further comprise code for: iteratively increasing an upper error bound, iteratively decreasing a lower error bound, or both, so a threshold number of GNSS measurements is satisfied.

An apparatus having means for performing the method of any one of clauses 1-18.

A non-transitory computer-readable medium storing instructions, the instructions comprising code for performing the method of any one of clauses 1-18.

A mobile device comprising a memory and one or more processors configured to perform, or cause the mobile device to perform, the method of any one of clauses 1-18.

What is claimed is:

1. A method of determining a position of a device comprising:

obtaining an initial position of the device without using Global Navigation Satellite System (GNSS) positioning;

taking GNSS measurements of radio frequency (RF) signals transmitted by GNSS satellites;

determining initial residuals based, at least in part, on GNSS measured distances determined from the at least a portion of the GNSS measurements and expected distances determined from the initial position;

estimating errors of the GNSS measurements, based at least in part, on the initial residuals and RF signals;

performing an optimization using the initial residuals and at least a portion of the errors to produce a modified set of residuals, wherein:

the optimization is further based on values, separate from the initial residuals and the errors, representing a geometry of the GNSS satellites; and the modified set of residuals comprises:

(i) the initial residuals, with a value of one or more of the initial residuals modified, (ii) the initial residuals, with one or more of the initial residuals multiplied by a respective weight, or (iii) both (i) and (ii); and using a cost minimization method on the modified set of residuals and the geometry of the GNSS satellites to determine an improved position of the device.

2. The method of determining the position of the device of claim 1, wherein the cost minimization method is based on a weighted least squares (WLS) calculation.

3. The method of determining the position of the device of claim 1, wherein estimating the errors of the GNSS measurements further comprises using machine learning to estimate the errors based on the RF signals.

4. The method of determining the position of the device of claim 1, further comprising:

using a base station of a terrestrial network to obtain the initial position of the device.

5. The method of determining the position of the device of claim 1, further comprising:

filtering the GNSS measurements to select the at least the portion of the GNSS measurements.

6. The method of determining the position of the device of claim 5, wherein the at least the portion of the GNSS measurements comprises at least a minimum threshold number of GNSS measurements used to determine the improved position.

7. The method of determining the position of the device of claim 1, further comprising:

iteratively increasing an upper error bound, iteratively decreasing a lower error bound, or both, so a threshold number of GNSS measurements is satisfied.

8. The method of determining the position of the device of claim 1, further comprising:

providing the improved position of the device to an operating system or application of the device;

sending the improved position to an application processor;

sending the improved position to another device;

providing the improved position to a graphical user interface for display; or any combination thereof.

9. The method of determining the position of the device of claim 1, wherein the geometry of the GNSS satellites includes a matrix with trigonometric functions of an azimuth and elevation of the GNSS satellites.

10. A device comprising:

a memory; and one or more processors communicatively coupled with the memory, wherein the one or more processors are configured to:

obtain an initial position of the device without using Global Navigation Satellite System (GNSS) positioning;

take GNSS measurements of radio frequency (RF) signals transmitted by GNSS satellites;

determine initial residuals based, at least in part, on GNSS measured distances determined from the at least a portion of the GNSS measurements and expected distances determined from the initial position;

estimate errors of the GNSS measurements, based at least in part, on the initial residuals and RF signals;

perform an optimization using the initial residuals and at least a portion of the errors to produce a modified set of residuals, wherein;

the optimization is further based on values, separate from the initial residuals and the errors, representing a geometry of the GNSS satellites; and the modified set of residuals comprises:

(i) the initial residuals, with a value of one or more of the initial residuals modified, (ii) the initial residuals, with one or more of the initial residuals multiplied by a respective weight, or (iii) both (i) and (ii); and use a cost minimization method on the modified set of residuals and the geometry of the GNSS satellites to determine an improved position of the device.

11. The device of claim 10, wherein one or more processors are configured to use the cost minimization method based on a weighted least squares (WLS) calculation.

12. The device of claim 10, wherein, to estimate the errors of the GNSS measurements, the one or more processors are configured to use a machine learning model to estimate the errors based on the RF signals.

13. The device of claim 10, wherein the one or more processors are further configured to:

obtain the initial position of the device from a base station of a terrestrial network to.

14. The device of claim 10, wherein the one or more processors are further configured to:

filter the GNSS measurements to select the at least the portion of the GNSS measurements.

15. The device of claim 14, wherein, to select the at least the portion of the GNSS measurements, the one or more processors are configured to select at least a minimum threshold number of GNSS measurements to determine the improved position.

16. The device of claim 10, wherein the one or more processors are further configured to:

iteratively increase an upper error bound, iteratively decrease a lower error bound, or both, so a threshold number of GNSS measurements is satisfied.

17. The device of claim 10, wherein the one or more processors are further configured to:

provide the improved position of the device to an operating system or application of the device;

send the improved position to an application processor;

send the improved position to another device;

provide the improved position to a graphical user interface for display; or any combination thereof.

18. The device of claim 10, wherein the geometry of the GNSS satellites includes a matrix with trigonometric functions of an azimuth and elevation of the GNSS satellites.

19. An apparatus for determining a position of a device comprising: the apparatus comprising:

means for obtaining an initial position of the device without using Global Navigation Satellite System (GNSS) positioning;

means for taking GNSS measurements of radio frequency (RF) signals transmitted by GNSS satellites;

means for determining initial residuals based, at least in part, on GNSS measured distances determined from the at least a portion of the GNSS measurements and expected distances determined from the initial position;

means for estimating errors of the GNSS measurements, based at least in part, on the initial residuals and RF signals;

means for performing an optimization using the initial residuals and at least a portion of the errors to produce a modified set of residuals, wherein:

the optimization is further based on values, separate from the initial residuals and the errors, representing a geometry of the GNSS satellites; and the modified set of residuals comprises:

(i) the initial residuals, with a value of one or more of the initial residuals modified, (ii) the initial residuals, with one or more of the initial residuals multiplied by a respective weight, or (iii) both (i) and (ii); and means for using a cost minimization method on the modified set of residuals and the geometry of the GNSS satellites to determine an improved position of the device.

20. The apparatus of claim 19, wherein the cost minimization method is based on a weighted least squares (WLS) calculation.

21. The apparatus of claim 19, wherein the means for estimating the errors of the GNSS measurements further comprises means for using machine learning to estimate the errors based on the RF signals.

22. The apparatus of claim 19, further comprising:
means for using a base station of a terrestrial network to obtain the initial position of the device.

23. The apparatus of claim 19, further comprising:
means for filtering the GNSS measurements to select the at least the portion of the GNSS measurements.

24. The apparatus of claim 19, further comprising:
means for iteratively increasing an upper error bound, iteratively decreasing a lower error bound, or both, so a threshold number of GNSS measurements is satisfied.

25. The apparatus of claim 19, further comprising:
means for providing the improved position of the device to an operating system or application of the device;
means for sending the improved position to an application processor;
means for sending the improved position to another device;
means for providing the improved position to a graphical user interface for display; or
any combination thereof.

26. A non-transitory computer-readable medium storing instructions for determining a position of a device comprising: the instructions comprising code for:
obtaining an initial position of the device without using Global Navigation Satellite System (GNSS) positioning;
taking GNSS measurements of radio frequency (RF) signals transmitted by GNSS satellites;
determining initial residuals based, at least in part, on GNSS measured distances determined from the at least a portion of the GNSS measurements and expected distances determined from the initial position;
estimating errors of the GNSS measurements, based at least in part, on the initial residuals and RF signals;
performing an optimization using the initial residuals and at least a portion of the errors to produce a modified set of residuals, wherein:
the optimization is further based on values, separate from the initial residuals and the errors, representing a geometry of the GNSS satellites; and
the modified set of residuals comprises:
(i) the initial residuals, with a value of one or more of the initial residuals modified,
(ii) the initial residuals, with one or more of the initial residuals multiplied by a respective weight, or
(iii) both (i) and (ii); and
using a cost minimization method on the modified set of residuals and the geometry of the GNSS satellites to determine an improved position of the device.

27. The computer-readable medium of claim 26, wherein the code for estimating the errors of the GNSS measurements comprises code for using machine learning to estimate the errors based on the RF signals.

28. The computer-readable medium of claim 26, wherein the instructions further comprise code for:
using a base station of a terrestrial network to obtain the initial position of the device.

29. The computer-readable medium of claim 26, wherein the instructions further comprise code for:
filtering the GNSS measurements to select the at least the portion of the GNSS measurements.

30. The computer-readable medium of claim 26, wherein the instructions further comprise code for:
iteratively increasing an upper error bound, iteratively decreasing a lower error bound, or both, so a threshold number of GNSS measurements is satisfied.

* * * * *